(12) United States Patent
Peleg et al.

(10) Patent No.: US 7,769,090 B2
(45) Date of Patent: Aug. 3, 2010

(54) ACTIVE LINK CABLE DIAGNOSTICS

(75) Inventors: Amir Peleg, Hod Hasharon (IL); Daniel Wajcer, Beit-Yehoshua (IL); Itay Lusky, Hod Hasharon (IL); Naftali Sommer, Rishon Letzion (IL); Nohik Semel, Kfar Saba (IL)

(73) Assignee: Texas Instruments Incorporated, Dallas, TX (US)

( * ) Notice: Subject to any disclaimer, the term of this patent is extended or adjusted under 35 U.S.C. 154(b) by 641 days.

(21) Appl. No.: 11/694,942

(22) Filed: Mar. 31, 2007

(65) Prior Publication Data
US 2007/0230555 A1 Oct. 4, 2007

Related U.S. Application Data

(60) Provisional application No. 60/788,409, filed on Mar. 31, 2006.

(51) Int. Cl.
*H04B 3/00* (2006.01)
(52) U.S. Cl. .................................................... 375/257
(58) Field of Classification Search ............... 375/257, 375/232, 222, 224; 342/533, 534, 543
See application file for complete search history.

(56) References Cited

U.S. PATENT DOCUMENTS

| 6,466,626 B1 * | 10/2002 | Cecchi et al. | 375/257 |
| 6,590,930 B1 * | 7/2003 | Greiss | 375/224 |
| 7,177,143 B1 * | 2/2007 | Gomez | 361/679.01 |

\* cited by examiner

*Primary Examiner*—Khai Tran
(74) *Attorney, Agent, or Firm*—Steven A. Shaw; W. James Brady; Frederick J. Telecky, Jr.

(57) ABSTRACT

A novel apparatus for and method of estimating the cable length of an active network link. The cable diagnostics mechanism of the invention is particularly suited for use in estimating the length of Ethernet network between two edges when the link is active, i.e. data is being transmitted in both directions simultaneously and the transmission of test pulses is not possible. The cable length estimation mechanism of the present invention is based on a well-known property of the spectrum of the insertion loss of the cable, namely, the linear relationship between the attenuation of the cable at a given frequency in decibels and the cable length. Information characterizing this relationship is extracted and used to determine the length of the cable.

21 Claims, 8 Drawing Sheets

ACTIVE LINK CABLE DIAGNOSTICS

REFERENCE TO PRIORITY APPLICATION

This application claims priority to U.S. Provisional Application Ser. No. 60/788,409, filed Mar. 31, 2006, entitled "Active link cable diagnostics", incorporated herein by reference in its entirety.

FIELD OF THE INVENTION

The present invention relates to the field of data communications and more particularly relates to an apparatus for and method of active link cable diagnostics.

BACKGROUND OF THE INVENTION

Modern network communication systems are generally of either the wired or wireless type. Wireless networks enable communications between two or more nodes using any number of different techniques. Wireless networks rely on different technologies to transport information from one place to another. Several examples include, for example, networks based on radio frequency (RF), infrared, optical, etc. Wired networks may be constructed using any of several existing technologies, including metallic twisted pair, coaxial, optical fiber, etc.

Communications in a wired network typically occurs between two communication transceivers over a length of cable making up the communications channel. Each communications transceiver comprises a transmitter and receiver components. A fault along the communication channel causes a disruption in communications between the transceivers. Typically, it is desirable to be able to determine when a fault occurs in the channel. Once a fault is detected, it is desirable to determine information about the fault, such as its location along the channel.

The deployment of faster and faster networks is increasing at an ever quickening pace. Currently, the world is experiencing a vast deployment of Gigabit Ethernet (GE) devices. As the number of installed gigabit Ethernet nodes increases, the need for reliable, comprehensive and user-friendly cable diagnostic tools has become more important than ever. The wide variety of cables, topologies and connectors deployed results in the need for non-intrusive identification and reporting of cable faults.

As part of a diagnostics capability, an important feature in the Ethernet plant is the ability to measure the length of the cable between two edges. This could be achieved in two different modes of operation: a non-active link mode and an active link mode of operation.

Performing cable diagnostics in active mode is problematic as during this mode of operation, data is sent in both directions. Furthermore, unlike in the non-active mode, the transmission of test pulses is not possible.

Thus, there is a need for a cable diagnostics mechanism that provides a means of performing cable diagnostics that overcomes the disadvantage of the prior art. The diagnostics mechanism should be capable of estimating the length of an Ethernet cable between two points. The mechanism should also be able to estimate the length of the cable while in the cable is in an active mode of operation. Further, it is desirable that the diagnostic mechanism be incorporated into a conventional communications transceiver without requiring extensive modifications to the transceiver.

SUMMARY OF THE INVENTION

The present invention is an apparatus for and method of estimating the cable length of an active network link. The cable diagnostics mechanism of the invention is particularly suited for use in estimating the length of Ethernet network between two edges when the link is active, i.e. data is being transmitted in both directions simultaneously and the transmission of test pulses is not possible.

The cable length estimation mechanism of the present invention is based on a well-known property of the spectrum of the insertion loss of the cable. Namely, the linear relationship between the attenuation of the cable at a given frequency in decibels and the cable length. Information characterizing this relationship can be extracted and used to determine the length of the cable. In one embodiment, data needed to calculate the cable length is obtained from a plurality of equalizer coefficients in the PHY circuit. In a second embodiment, data needed to calculate the cable length is obtained from the signal received over the cable. In order to avoid gain issues, the channel spectrum is sampled at two different frequencies and the slope of the relationship between cable attenuation and length is calculated. The linear relationship remains valid permitting the cable length to be calculated using the well-known equation length =a·slope+b.

Note that depending on the actual implementation, the calculation of the cable length estimate may be performed completely in the PHY circuit itself or may be performed partially in the PHY circuit and partially in the host (i.e. in-circuit or external processor).

To aid in understanding the principles of the present invention, the description is provided in the context of a cable diagnostics module suitable for use in a cable system such as a DOCSIS 3.0 capable cable system comprising a cable modem adapted to receive an RF feed from a cable head-end (i.e. CMTS) and to distribute video, Internet and telephony to a subscriber premises. It is appreciated, however, that the invention is not limited to use with any particular communication device or standard and may be used in optical, wired and wireless applications. Further, the invention is not limited to use with a specific technology but is applicable to any system that employs differential encoding/decoding and FEC decoding such as Reed Solomon decoding.

Note that many aspects of the invention described herein may be constructed as software objects that are executed in embedded devices as firmware, software objects that are executed as part of a software application on either an embedded or non-embedded computer system running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is thus provided in accordance with the invention, a method of estimating the cable length of an active link in a network, the method comprising the steps of determining a first channel spectrum magnitude at a first frequency and a second channel spectrum magnitude at a second frequency, calculating a channel spectrum slope from the first channel spectrum magnitude and the second channel spectrum magnitude and calculating the cable length estimate from the channel spectrum slope.

There is also provided in accordance with the invention, an apparatus for estimating the cable length of an active link in a network comprising means for measuring a first attenuation over the link at a first frequency and a second attenuation over the link at a second frequency, means for calculating slope as a function of the first attenuation and the second attenuation measurements and means for calculating the cable length estimate as a function of the slope and linear calibration constants $K_1$ and $K_2$.

There is further provided in accordance with the invention, a cable modem comprising a memory, one or more interface ports, a tuner coupled to a CATV cable having a plurality of channels, the tuner operative to tune a received broadband signal in accordance with a tune command, a PHY circuit coupled to the tuner and operative to generate a baseband signal from the output of the tuner, a cable diagnostics module for estimating the slope of the linear relationship between cable attenuation and length for an active link in a network, the cable diagnostics module comprising means for measuring a first attenuation over the link at a first frequency and a second attenuation over the link at a second frequency, means for calculating slope as a function of the first attenuation and the second attenuation measurements and a processor coupled to the memory, the one or more interface ports, the tuner, the cable diagnostics module and the PHY circuit, the processor comprising means for calculating the cable length estimate as a function of the slope and linear calibration constants $K_1$ and $K_2$.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
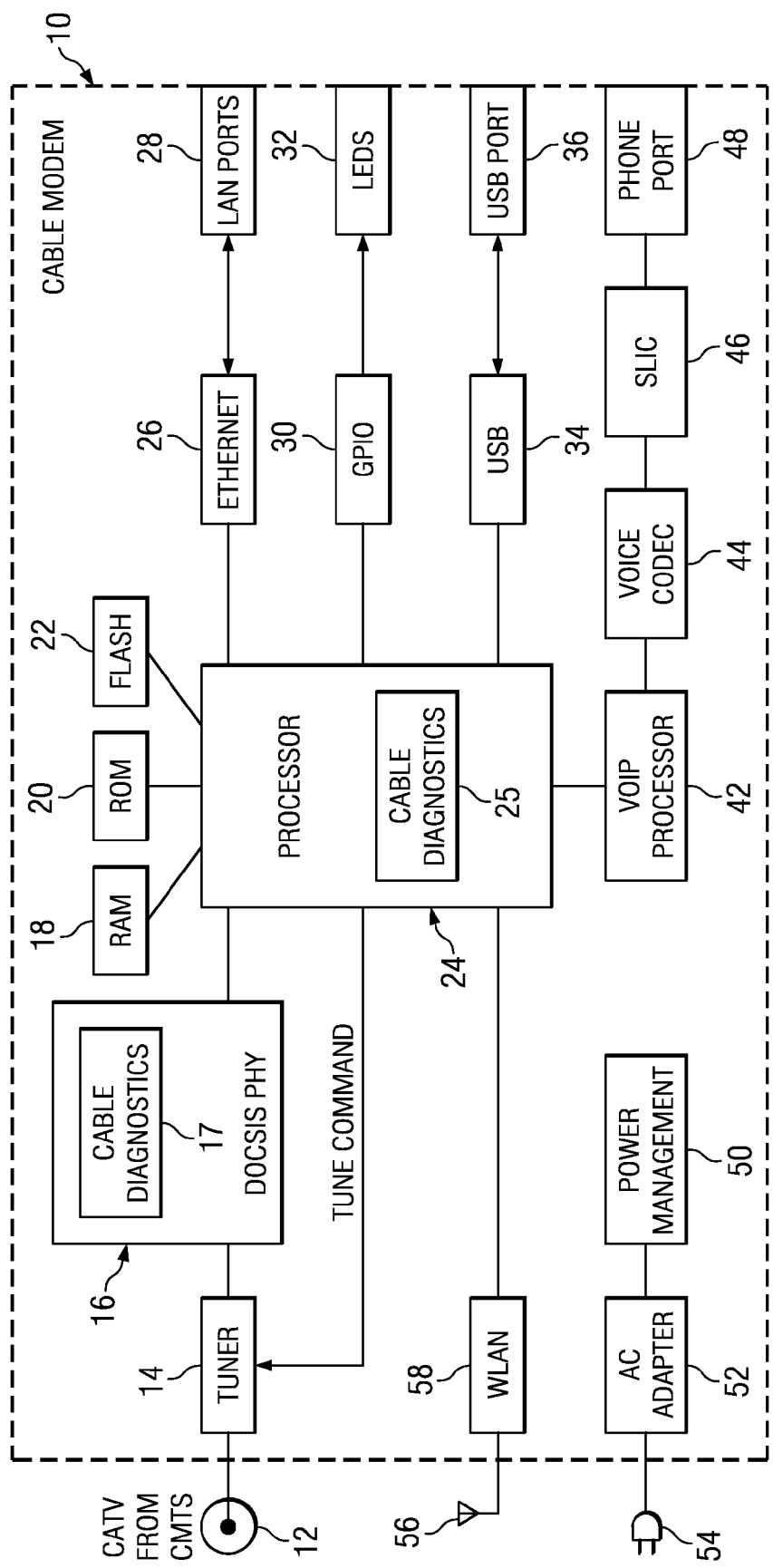
FIG. 1 is a block diagram illustrating an example cable modem system incorporating the active link cable diagnostic mechanism of the present invention.

The following notation is used throughout this document.

| Term | Definition |
| --- | --- |
| AC | Alternating Current |
| ASIC | Application Specific Integrated Circuit |
| CATV | Community Antenna Television or Cable TV |
| CMTS | Cable Modem Termination System |
| CO | Central Office |
| CPU | Central Processing Unit |
| DC | Direct Current |
| DFE | Decision Feedback Equalizer |
| DFT | Discrete Fourier Transform |
| DOCSIS | Data Over Cable Service Interface Specification |
| DSP | Digital Signal Processor |
| EEROM | Electrically Erasable Read Only Memory |
| FEC | Forward Error Correction |
| FFE | Feed Forward Equalizer |
| FFT | Fast Fourier Transform |
| FPGA | Field Programmable Gate Array |
| GE | Gigabit Ethernet |
| GPIO | General Purpose I/O |
| HDL | Hardware Description Language |
| HPF | High Pass Filter |
| I/O | Input/Output |
| IC | Integrated Circuit |
| IEEE | Institute of Electrical and Electronic Engineers |
| IP | Internet Protocol |
| LAN | Local Area Network |
| LED | Light Emitting Diode |
| LUT | Lookup Table |
| MAC | Media Access Control |
| MSB | Most Significant Bit |
| NCO | Numerically Controlled Oscillator |
| POTS | Plain Old Telephone Service |
| QAM | Quadrature Amplitude Modulation |
| RAM | Random Access Memory |
| RF | Radio Frequency |
| ROM | Read Only Memory |
| RS | Reed Solomon |
| SLIC | Subscriber Line Interface Card |
| USB | Universal Serial Bus |
| VoIP | Voice over IP |
| WLAN | Wireless Local Area Network |

DETAILED DESCRIPTION OF THE INVENTION

The present invention is a novel apparatus for and method of estimating the cable length of an active network link. The cable diagnostics mechanism of the invention is particularly suited for use in estimating the length of Ethernet network between two edges when the link is active, i.e. data is being transmitted in both directions simultaneously and the transmission of test pulses is not possible.

The cable length estimation mechanism of the present invention is based on a well-known property of the spectrum of the insertion loss of the cable. Namely, the linear relationship between the attenuation of the cable at a given frequency in decibels and the cable length. Information characterizing this relationship can be extracted and used to determine the length of the cable. In one embodiment, data needed to calculate the cable length is obtained from a plurality of equalizer coefficients in the PHY circuit. In a second embodiment, data needed to calculate the cable length is obtained from the signal received over the cable. In order to avoid gain issues, the channel spectrum is sampled at two different frequencies and the slope of the relationship between cable attenuation and length is calculated. The linear relationship remains valid permitting the cable length to be calculated using the well-known equation length =a·slope+b.

Note that depending on the actual implementation, the calculation of the cable length estimate may be performed completely in the PHY circuit itself or may be performed partially in the PHY circuit and partially in the host (i.e. in-circuit or external processor).

To aid in understanding the principles of the present invention, the description is provided in the context of a cable diagnostic module suitable for use in a cable system such as a DOCSIS 3.0 capable cable system comprising a cable modem adapted to receive an RF feed from a cable head-end (i.e. CMTS) and to distribute video, Internet and telephony to a subscriber premises. It is appreciated, however, that the invention is not limited to use with any particular communication device or standard and may be used in optical, wired and wireless applications. Further, the invention is not limited to use with a specific technology but is applicable to any system that employs differential encoding/decoding and FEC decoding such as Reed Solomon (RS) decoding.

Note that throughout this document, the term communications device is defined as any apparatus or mechanism adapted to transmit, or transmit and receive data through a medium. The communications device may be adapted to communicate over any suitable medium such as RF, wireless, infrared, optical, wired, microwave, etc. In the case of wireless communications, the communications device may comprise an RF transmitter, RF receiver, RF transceiver or any combination thereof.

The term cable modem is defined as a modem that provides access to a data signal sent over the cable television infrastructure. The term voice cable modem is defined as a cable modem that incorporates VoIP capabilities to provide telephone services to subscribers. Channel bonding is defined as a load-sharing technique for logically combining multiple DOCSIS channels into a single virtual pipe. It is described in detail in the DOCSIS 3.0 specification, incorporated herein by reference in its entirety.

The word 'exemplary' is used herein to mean 'serving as an example, instance, or illustration.' Any embodiment described herein as "exemplary" is not necessarily to be construed as preferred or advantageous over other embodiments.

Voice Cable Modem Incorporating Active Cable Diagnostics

A block diagram illustrating an example cable modem incorporating an active cable diagnostics mechanism of the present invention is shown in FIG. 1. The cable modem, generally referenced 10, comprises a tuner 14, DOCSIS PHY circuit 16 incorporating a cable diagnostics block 17 operative to implement the active cable diagnostics mechanism of the present invention, DOCSIS compatible processor 24 also incorporating a host portion 25 of the cable diagnostics mechanism of the invention, VoIP processor 42, voice codec 44, subscriber line interface card (SLIC) 46, phone port 48, antenna 56, wireless local area network (WLAN) 58, Ethernet interface 26, Ethernet LAN port 28, general purpose (I/O) (GPIO) interface 30, LEDs 32, universal serial bus (USB) interface 34, USB port 36, AC adapter 52, power management circuit 50, ROM 20, RAM 18 and FLASH memory 22. Note that in the example embodiment presented herein, the cable modem and DOCSIS enabled processor 24 are adapted to implement the DOCSIS 3.0 standard.

In operation, the cable modem processor 24 is the core chip set which in the example presented herein comprises a central single integrated circuit (IC) with peripheral functions added.

The voice over IP (VoIP) processor 42 implements a mechanism to provide phone service outside the standard telco channel. Chipset DSPs and codecs 44 add the functionality of POTS service for low rate voice data.

The cable modem also comprises a subscriber line interface card (SLIC) 46 which functions to provide the signals and functions of a conventional local loop to a plurality of telephone devices connected via the phone port 48 using internal 2-wire telephone wiring. In particular, it generates call progress tones including dial tone, ring tone, busy signals, etc. that are normally provided by the local loop from the CO. Since the telephone deices are not connected to the CO, the SLIC in the cable modem must provide these signals in order that the telephone devices operate correctly.

In a traditional analog telephone system, each telephone or other communication device (i.e. subscriber unit) is typically interconnected by a pair of wires (commonly referred to as tip and ring or together as subscriber lines, subscriber loop or phone lines) through equipment to a switch at a local telephone company office (central office or CO). At the CO, the tip and ring lines are interconnected to a SLIC which provides required functionality to the subscriber unit. The switches at the central offices are interconnected to provide a network of switches thereby providing communications between a local subscriber and a remote subscriber.

The SLIC is an essential part of the network interface provided to individual analog subscriber units. The functions provided by the SLIC include providing talk battery (between 5 VDC for on-hook and 48 VDC for off-hook), ring voltage (between 70-90 VAC at a frequency of 17-20 Hz), ring trip, off-hook detection, and call progress signals such as ringback, busy, and dial tone.

A SLIC passes call progress tones such as dial tone, busy tone, and ringback tone to the subscriber unit. For the convenience of the subscriber who is initiating the call, these tones normally provided by the central office give an indication of call status. When the calling subscriber lifts the handset or when the subscriber unit otherwise generates an off hook condition, the central office generates a dial tone and supplies it to the calling subscriber unit to indicate the availability of phone service. After the calling subscriber has dialed a phone number of the remote (i.e. answering) subscriber unit, the SLIC passes a ring back sound directed to the calling subscriber to indicate that the network is taking action to signal the remote subscriber, i.e. that the remote subscriber is being rung. Alternatively, if the network determines that the remote subscriber unit is engaged in another call (or is already off-hook), the network generates a busy tone directed to the calling subscriber unit.

The SLIC also acts to identify the status to, or interpret signals generated by, the analog subscriber unit. For example, the SLIC provides −48 volts on the ring line, and 0 volts on the tip line, to the subscriber unit. The analog subscriber unit provides an open circuit when in the on-hook state. In a loop start circuit, the analog subscriber unit goes off-hook by closing, or looping the tip and ring to form a complete electrical circuit. This off-hook condition is detected by the SLIC (whereupon a dial tone is provided to the subscriber). Most residential circuits are configured as loop start circuits.

Connectivity is provided by a standard 10/100/1000 Mbps Ethernet interface 26 and Ethernet LAN port 28, USB interface 34 and USB port 36 or with additional chip sets, such as wireless 802.11a/b/g via WLAN interface 58 coupled to antenna 56. In addition, a GPIO interface 30 provides an interface for LEDs 32, etc. The network connectivity functions may also include a router or Ethernet switch core. Note that the Ethernet MAC 38 and PHY 16 are typically integrated into the cable modem processor 24 or may be separate as shown in FIG. 1 wherein the DOCSIS PHY circuit 16 is shown separate from the processor 24.

In the example embodiment presented herein, the tuner 14 is coupled to the CATV signal from the CMTS via port 12 and is operative to convert the RF signal received over the RF cable to an IF frequency in accordance with a tune command received from the processor.

The cable modem 10 comprises a processor 24 which may comprise a digital signal processor (DSP), central processing unit (CPU), microcontroller, microprocessor, microcomputer, ASIC, FPGA core or any other suitable processing means. The cable modem also comprises static read only memory (ROM) 20, dynamic main memory 18 and FLASH memory 22 all in communication with the processor via a bus (not shown).

The magnetic or semiconductor based storage device 18 (i.e. RAM) is used for storing application programs and data. The cable modem comprises computer readable storage medium that may include any suitable memory means, including but not limited to, magnetic storage, optical storage, semiconductor volatile or non-volatile memory, biological memory devices, or any other memory storage device.

Although in the example provided herein, the active cable diagnostics mechanism is implemented in hardware and partly in software for the host portion, in alternative embodiments it could be implemented in software or a combination of hardware and software. Software adapted to implement the active cable diagnostics mechanism of the present invention is adapted to reside on a computer readable medium, such as a magnetic disk within a disk drive unit. Alternatively, the computer readable medium may comprise a floppy disk, removable hard disk, Flash memory 22, EEROM based memory, bubble memory storage, ROM storage 20, distribution media, intermediate storage media, execution memory of a computer, and any other medium or device capable of storing for later reading by a computer a computer program implementing the system and methods of this invention. The software adapted to implement the active cable diagnostics mechanism of the present invention may also reside, in whole or in part, in the static or dynamic main memories 18 or in firmware within the processor of the computer system (i.e. within microcontroller, microprocessor or microcomputer internal memory).

Using FFE-DFE Coefficients

The estimation of cable length as performed by the invention is based on a well-known property of the spectrum of the insertion loss, i.e. the linear relationship between the attenuation at a given frequency in decibels and the cable length. This information can be extracted either from the equalizer coefficients or from the received signal in the PHY circuit. In order to avoid gain issues, the spectrum is sampled at two different frequencies and the slope is then calculated. The linear relation remains valid so the length can be calculated in a simple way using $$\text{length} = a \cdot \text{slope} + b \quad (1)$$

Depending on the implementation, this calculation can be performed on the host, e.g., processor 24 (FIG. 1) or can be performed in hardware in the PHY 16.

Figure 2:
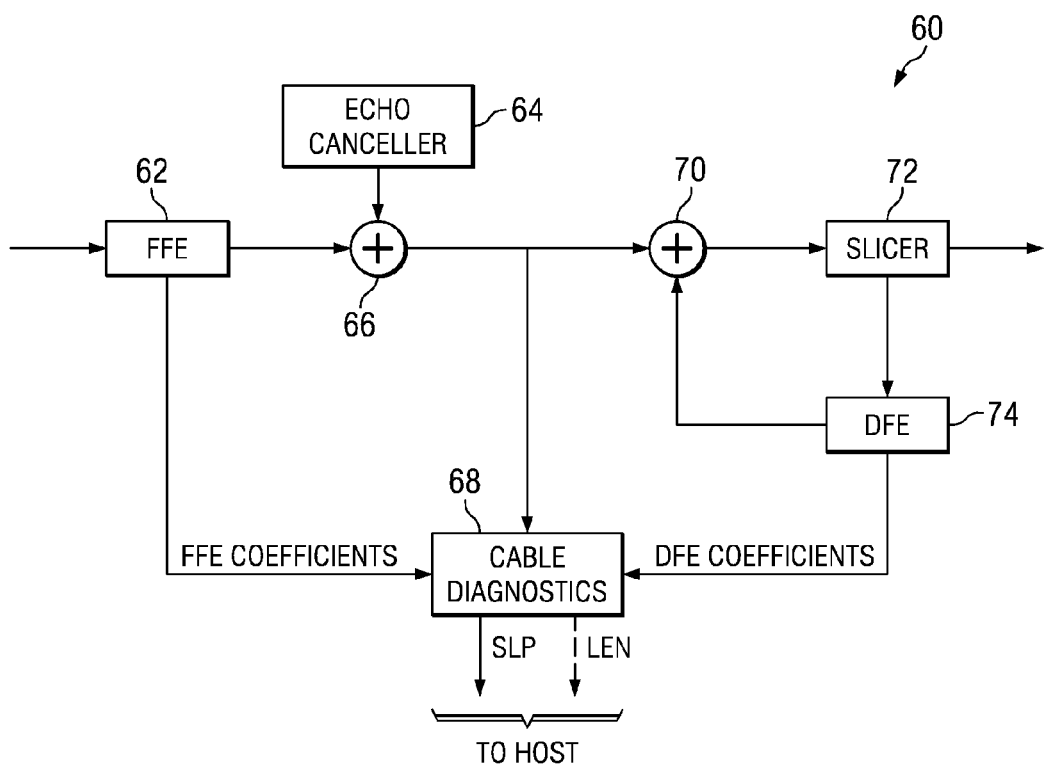
FIG. 2 is a block diagram illustrating an example Ethernet PHY scheme incorporating the cable diagnostic mechanism of the present invention.

A block diagram illustrating an example Ethernet PHY scheme incorporating the cable diagnostic mechanism of the present invention is shown in FIG. 2. The circuit, generally referenced 60, is a portion of the PHY circuit 16 (FIG. 1). The circuit comprises a feed forward equalizer (FFE) 62, adders 66, 70, echo canceller 64, slicer 72, decision feedback equalizer (DFE) 74 and cable diagnostics block 68. Depending on the implementation, the cable diagnostics block 68 is operative to either generate slope information which is then processed further by the host to estimate cable length or to generate the cable length directly thus obviating the need for the host processing. In operation, the cable diagnostics block of the invention generates the slope/length information using the FFE and DFE coefficients as input.

The attenuation of the cable is given as a function of the frequency, and is linear with the cable length (per frequency). Thus, the slope of the spectrum indicates the cable length. The channel spectrum is estimated by performing a discrete Fourier transform (DFT) on the feed forward equalizer and decision feedback equalizer (DFE) coefficients. This procedure is performed at two frequencies. For example, at 7 MHz and 43 MHz. The spectrum in each frequency is given by $$\frac{DFT(FFE)}{DFT(DFE)}$$

hence the slope (at frequencies f1 and f2) is given by $$\text{slope} = \frac{DFT(FFE, f1)[dB]}{DFT(DFE, f1)[dB]} - \frac{DFT(FFE, f2)[dB]}{DFT(DFE, f2)[dB]} \quad (2)$$

In order to translate the DFT results to decibels, the mechanism uses a logarithmic look up table. The slope calculation is then given by the following $$\text{slope} = \log(DFT(FFE, f2)) + \log(DFT(DFE, f1)) - \log(DFT(FFE, f1)) - \log(DFT(DFE, f2)) \quad (3)$$

The basic DFT processor is a direct implementation of the DFT equations:

$$x_{real} = \sum_{n=0}^{N-1} a_n \cos(2\pi f n) \quad (5)$$

$$x_{imag} = \sum_{n=0}^{N-1} a_n \sin(2\pi f n) \quad (6)$$

$$|x|^2 = x_{real}^2 + x_{imag}^2 \quad (7)$$

Note that for a predetermined frequency, the sine and cosine values are constants but are affected by the number of coefficients supplied.

Using Signal Spectrum

Figure 3:
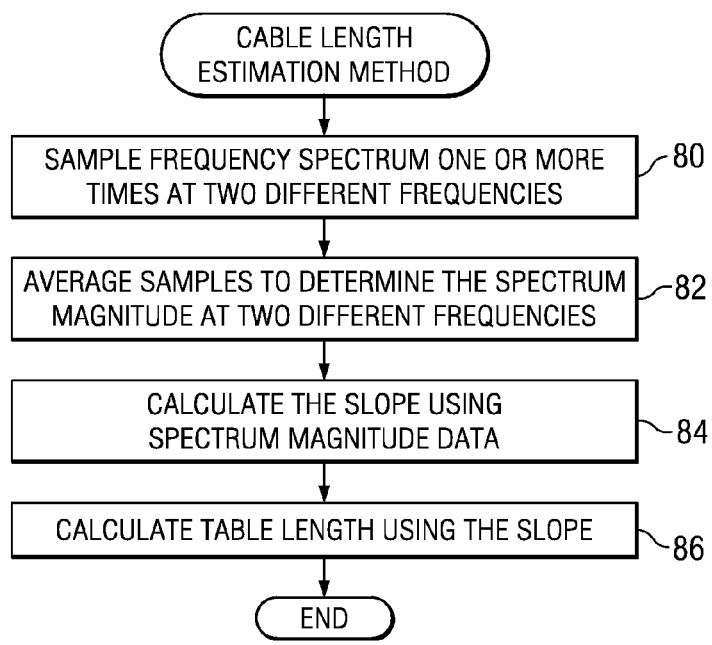
FIG. 3 is a flow diagram illustrating the cable length estimation method of the present invention.

Based on the same principal of the FFE-DFE slope, the cable length is estimates according to the channel spectrum slope. A flow diagram illustrating the cable length estimation method of the present invention is shown in FIG. 3. To achieve this, several DFT operations are performed on the signal at two different frequencies (step 80). The frequency spectrum is sampled one or more times at each frequency. The samples are averaged to determine the spectrum magnitude at the desired frequencies (step 82). The slope is then calculated the spectrum magnitude data (step 84). The cable length is then estimated using the slope (step 86).

Note that the linearity to the cable length is maintained in this case as well. In order to obtain fine spectrum estimation, the signal has to be very long (e.g., 4 Msymbols) in order to get an error of less than 2-3 meters, as shown in Table 1 below. Note that we need to obtain the input signal from the slicer input before DFE correction because it is the echo that should preferably be cancelled first.

TABLE 1

Average FFT length versus maximum error

| Average FFT | Max Error (meters) |
|---|---|
| 512 | 10 |
| 1024 | 7.5 |
| 2048 | 5 |
| 4096 | 2.5 |

Depending on the implementation, the FFE may have a third tap in the presence of echo in long cables, which 'shortens' the channel thus relaxing the echo canceling demands. This third tap is compensated for by the DFE processing later on. Since the signal for the cable diagnostics is taken from the echo canceller output (i.e. after the FFE), the third tap of the FFE must be compensated for. If the third tap is not compensated for, although it is minor in value, it has a 2-3 meter error enhancement which results in a possible 5-6 meter length estimation error.

Compensation can be done as follows:

$$\text{ffe\_out}[n] = -\frac{1}{8}\text{ffe\_in}[n+1] + \text{ffe\_in}[n] + \alpha \cdot \text{ffe\_in}[n-1] \quad (8)$$

where $\alpha$ is the third tap of the FFE. With knowledge that the FFE of two constant taps has no effect on the cable diagnostics operation, we attempt to eliminate the third tap effect by:

$$\text{cable\_diag\_in}[n] = \text{ffe\_out}[n] - \alpha \cdot \text{ffe\_in}[n-1] \quad (9)$$

This requires an additional adder to subtract the third tap of the FFE. Since the first tap of the FFE is configurable, however, the linear constants should be configurable as well according to this value which effects the spectrum and hence the slope. This is not practical since the first tap comprises 5-bits and it may be configured differently for various cable lengths and thus requires the host to be informed of the first tap that was used in order to calculate the cable length estimate.

The solution to this problem is to fully compensate for the FFE affect on the spectrum by dividing its FFT transform. Thus, for the FFE coefficients we repeat the action taken with the DFE in the equalizer slope option. Thus the slope is given by $$\text{slope} = \log(DFT(SIG, f2)) + \log(DFT(FFE, f1)) - \log(DFT(SIG, f1)) - \log(DFT(FFE, f2)) \quad (10)$$

Another difference from the FFE-DFE mode is the frequencies actually examined. Here the low frequency is 24/1024 (1.46 MHz) and the high frequency is 174/1024 (10.6 MHz), which were found empirically to yield optimal results.

It is noted that the best results were achieved using frequencies that theoretically do not have much energy due to the high pass filter (HPF) at 6 MHz. This might result from the fact that when measuring frequencies 7 MHz and 43 MHz, the slope is affected dramatically if the value measured at one frequency is higher while the value measured at the second frequency is a lower than expected. When measuring 1.4 MHz and 10.6 MHz, for example, we are affected at only one frequency (i.e. 10.6 MHz) since 1.4 MHz is masked by the HPF.

Module Calibration

Figure 4:
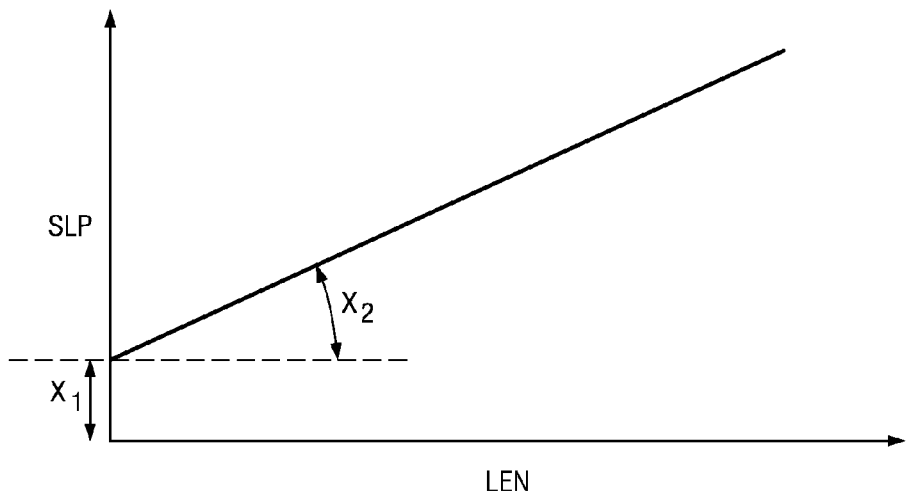
FIG. 4 is a graph illustrating the linear relationship between the spectrum slope and the cable length.

As described supra, a linear relation exists between the channel spectrum slope (hereinafter denoted SLP) and the cable length (hereinafter denoted as LEN) such that $SLP=x_2 \cdot LEN+x_1$ as shown in FIG. 4. In one embodiment, the output of the cable diagnostic module 68 (FIG. 3) is the SLP. In this case, the SLP value is read by a host or other processing entity (i.e. processor 24 (FIG. 1) and used to calculate the cable length estimate. The host extracts the LEN by inverting the linear relationship between slope and cable length yielding $LEN=A \cdot SLP+B$, where $A=1/x_2$ and $B=x_1/x_2$. In an alternative embodiment, however, the cable diagnostic module is operative to generate not only the SLP but also the cable length estimate (shown as dotted arrow).

Note that the constant $x_1$ is length independent hence it is a system parameter. It can be calculated using simulations but can be modified when the mechanism is implemented in hardware. Note also that if only a single point (i.e. SLP) on the linear line is provided, $x_2$ can be calculated from the expression $x_2=(SLP-x_1)/LEN$. In this case, $x_1$ is set to its default value. In addition, if several points (i.e. several measurements of SLP for different lengths) are available, a least squares method is used to determine A and B directly.

The invention provides for three modes of calibration as follows. In the first mode, $x_1$ and $x_2$ (hence A and B) are set to the default values as calculated by simulations using IEEE cable models. This calibration mode (i.e. using default values) yields errors within approximately 10 m. In the second mode, a single SLP is measured by the user wherein $x_1$ is set to a default value and $x_2$ is calculated accordingly as described supra. Then, A and B are calculated using $x_1$ and $x_2$. In this calibration mode (i.e. using a single measurement), the measurement must be made using a long cable (i.e. 100 m or longer). The resultant errors should not exceed 5 meters. In the third mode, more than one SLP value is measured by the user. In this case, a least squares estimation is performed to calculate A and B. In this calibration mode (i.e. multiple measurements) errors are within 5 meters, in the case of four SLP measurements.

DFT Length Estimation

It is well-known in the art that the attenuation of the network cable is linear with the cable length (for a particular frequency). In order to achieve independency of signal gain, the spectrum slope is measured at two frequencies. Note that the slope is also linear with cable length. The objective of this section is to describe and clarify the process of estimating the cable length using the signal spectrum.

Let us denote the following $$A_H(L, f)[\text{dB}] = A_{H100}(f) \cdot \frac{L}{100}[\text{dB}] \quad (11)$$

$$A_P(L, f)[\text{dB}] = A_{P100}(f) \cdot \frac{L}{100}[\text{dB}] = A_H(L, f) \cdot 1.2[\text{dB}] \quad (12)$$

where $A_H(L,f)$ denotes the attenuation of a horizontal cable of length L at frequency f;

$A_{H100}(f)$ denotes the attenuation of a horizontal cable of length 100 m;

$A_P(L,f)$ denotes the attenuation of a patch cable of length L at frequency f;

Let us also denote the length-independent attenuation as B(f), which represents a spectral mask which is independent of the cable length (i.e. a system parameter resulting from the filtering and physics of the system).

As described supra, the cable diagnostics module 68 (FIG. 2) is operative to measure the slope of the signal spectrum denoted as slp. In case of a horizontal cable with no patches, the slp can be expressed as the following:

$$slp(L) = [A_{H100}(f1) - A_{H100}(f2)] \cdot \frac{L}{100} + B(f1) - B(f2) \quad (13)$$

The cable length L can be extracted from the slp by the linear operation $$L = K_1 \cdot slp + K_2 \quad (14)$$

where the constants $K_1$ and $K_2$ are given by $$K_1 = \frac{100}{A_{H100}(f1) - A_{H100}(f2)} \quad (15)$$

$$K_2 = -\frac{100 \cdot [B(f1) - B(f2)]}{A_{H100}(f1) - A_{H100}(f2)} \quad (16)$$

Note that these variables should be provided by the user.

If the cable topology comprises a combination of horizontal and patch cables, the slope is given instead by the following expression $$\begin{aligned} slp(L_H, L_P) &= [A_{H100}(f1) - A_{H100}(f2)] \cdot \frac{L_H}{100} + [A_{P100}(f1) - \\ &\quad A_{P100}(f2)] \cdot \frac{L_P}{100} + B(f1) - B(f2) \\ &= [A_{H100}(f1) - A_{H100}(f2)] \cdot \frac{L_H}{100} + [A_{H100}(f1) - \\ &\quad A_{H100}(f2)] \cdot 1.2 \cdot \frac{L_P}{100} + B(f1) - B(f2) \end{aligned} \quad (17)$$

In this case the cable length L is extracted from the slp by the linear operation $$L_H = K_1 \cdot slp + K_2 \quad (18)$$

where the constants $K_1$ and $K_2$ are given by $$K_1 = \frac{100}{A_{H100}(f1) - A_{H100}(f2)} \quad (19)$$

$$K_2 = -\left(\frac{B(f1) - B(f2)}{A_{H100}(f1) - A_{H100}(f2)} + \frac{1.2 \cdot L_P}{100}\right) \quad (20)$$

These results have been validated using Matlab simulation. The model is given by $$LEN = K_1 \cdot slp + K_2 \quad (21)$$

or $$slp = C_1 \cdot LEN + C_2 \quad (22)$$

Figure 5:
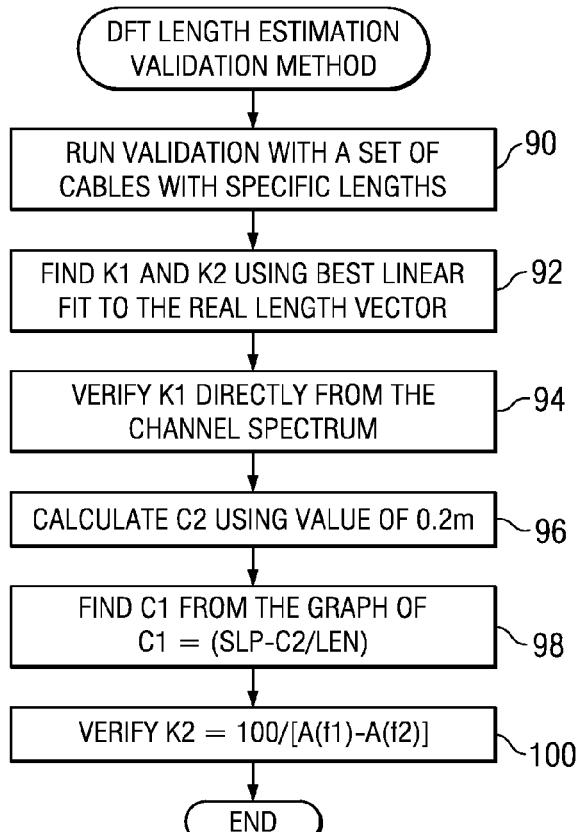
FIG. 5 is a flow diagram illustrating an exemplary DFT length estimation validation algorithm of the present invention.

A flow diagram illustrating an exemplary DFT length estimation validation algorithm of the present invention is shown in FIG. 5. The validation is run using a set of cables with specific known lengths (step 90). For example, a set of cables with length [0.2 20:10:120] is used. Then the constants $K_1$ and $K_2$ are found using a best linear fit to the real length vector (step 92). The constant $K_1$ is verified directly from the channel spectrum (step 94). Using the value of 0.2 meter, calculate $C_2$ (step 96). Finally, constant $C_1$ is found from the graph of $C_1 = (slp - C_2)/LEN$ (step 98) and the constant $K_2$ is verified using $K_2 = 100/[A(f1) - A(f2)]$.

As an example, the following values for the constants were determined from the graph of the slope:

$C_1 = 0.021$
$C_2 = -5.56$
$K_1 = -C_2/C_1 = \sim 256$
$K_2 = 1/C_1 = \sim 47$

Verification of $K_1$: $K_1 = 100/[A(f1) - A(f2)] = 100/0.39 = 256$

Fixed-Point Implementation

Figure 6:
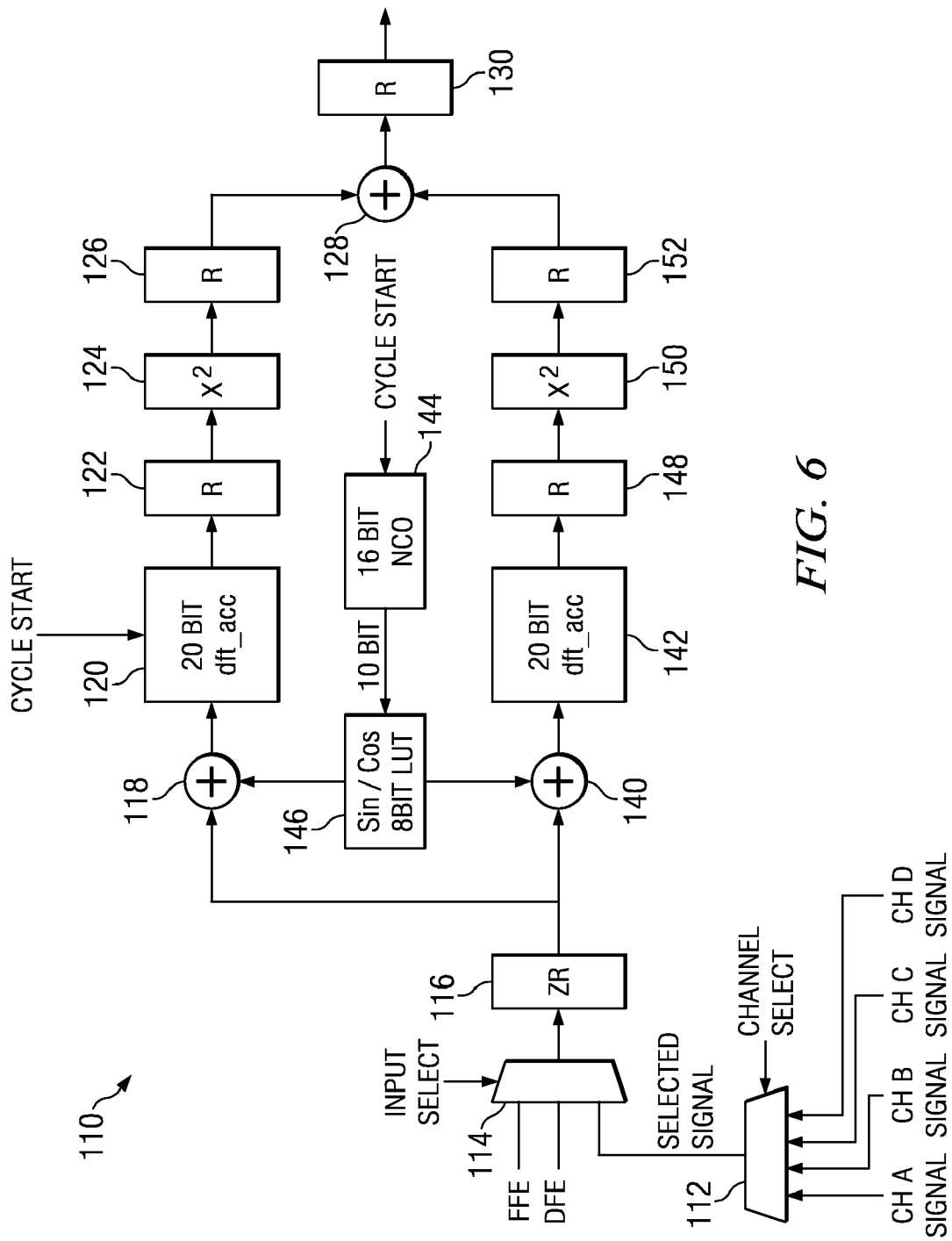
FIG. 6 is a block diagram illustrating an example fixed point signal flow of the present invention.

A block diagram illustrating an example fixed point signal flow of the present invention is shown in FIG. 6. The circuit, generally referenced 110, comprises a channel select multiplexer 112, input select multiplexer 114, Zround 116, multipliers 118, 140, adder 128, rounder 122, 126, 148, 152, squarers 124, 150, sin/cos look up table (LUT) 146, NCO 144 and DFT accumulators 120, 142.

In the case of fixed-point implementation of the DFT circuit quantization and log table quantization, (and length calculation unless performed in the host) the following applies. Note that although not specified in FIG. 6, the FFE and DFE coefficients are also selected by a multiplexer between all channels. In the example embodiment presented herein, regarding the bit allocation in the DFT engine, the NCO comprises 16-bit for 2 kHz resolution ($\log_2(125e6/2e3)$). The resolution of the DFT_ACCs 120, 142 are (20, 32) for a 1024 bin DFT. DFT_ACC is set (20, 32) in accordance with simulations. If the sum elements are approximated as independent, then the sum will be approximately Gaussian with standard deviation relative to sqrt(N), where N is the DFT length. Simulations have validated this approximation, e.g., for N=256 the required maximum level is 8.5 and for N=1024 it is 17 (N was multiplied by four so the maximum level was multiplied by sqrt(4)=2).

The rounder 122, 148 (14, 32) and 126, 152 (20, 1024) were also selected according to simulations which resulted in no performance degradation. The input of the cable diagnostics module is rounded to 10-bits using the rounder.

Table 2 presented below shows the effect of the input quantization for IEEE model H channels.

TABLE 2

Input bits versus maximum error

| Input Bits | Max Error (meters) |
|---|---|
| 11 | 1 |
| 10 Zround | 1 |

TABLE 2-continued

Input bits versus maximum error

| Input Bits | Max Error (meters) |
| --- | --- |
| 10 round | 1 |
| 10 truncate | <2 |
| 8 | 4 |

Table 3 presented below shows the effect of the LOG_TBL size on the length estimation.

TABLE 3

Effect of LOG_TBL size on length estimation error

| Test Number | Description | tbl_bits | tbl_width | Max Error (meters) |
| --- | --- | --- | --- | --- |
| 1 | H (20:120) | Inf | Inf | 2.3 (1.5) |
|   |            | 8   | 8   | 2.8 (1.7) |
|   |            | 8   | 10  | 3 (1.8) |
|   |            | 10  | 10  | 2.6 (1.4) |
| 2 | PCHCP (20:120) | Inf | Inf | 1.2 (1) |
|   |            | 8   | 8   | 1.2 (1.1) |
|   |            | 8   | 10  | 1.2 (1) |
|   |            | 10  | 10  | 0.8 (0.8) |
| 3 | PHCHCP (20:120) | Inf | Inf | 2.5 (1.6) |
|   |            | 8   | 8   | 2.7 (1.7) |
|   |            | 8   | 10  | 2.3 (1.8) |
|   |            | 10  | 10  | 2 (1.4) |

Note that the numbers in brackets are for optimal linearity coefficients. The tests to obtain data for this table were performed with a theoretical channel model. Configurations are horizontal (H), patch (P) and connector (C).

Figure 7:
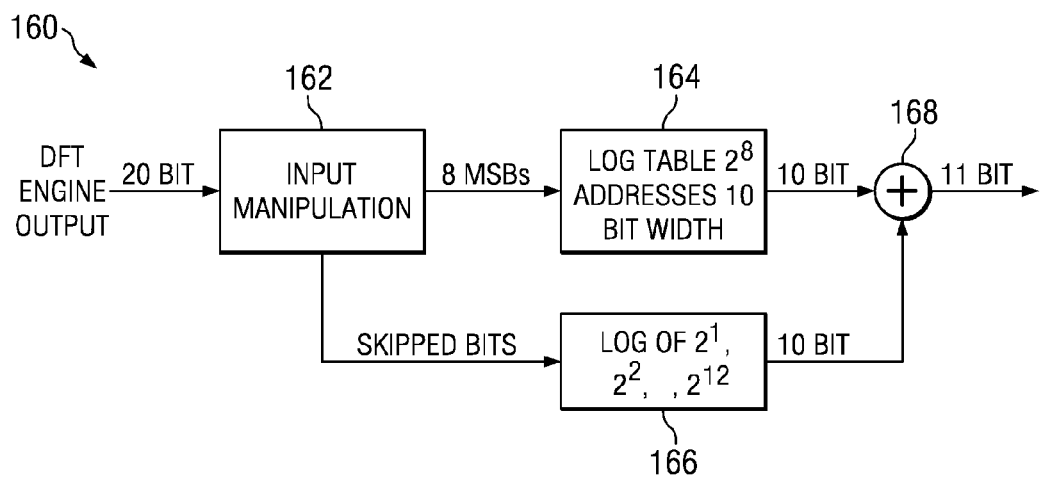
FIG. 7 is a block diagram illustrating an example table implementation scheme of the present invention.

A block diagram illustrating an example table implementation scheme of the present invention is shown in FIG. 7. The circuit, generally referenced 160, comprises an input manipulation block 162, LOG table 164, LOG block 166 and adder 168. In the example embodiment presented herein, the LOG_TBL is implemented as an 8-bit table, but access to the table exploits the logarithmic characteristic of $\log(a \cdot b) = \log(a) + \log(b)$. If the desired value is larger than 8-bits, only first 8-bits are input to the LOG_TBL and the remaining skipped bits are added afterwards. The remainder of the bits other than the first 8 MSBs are disregarded. The LOG_TBL output in this example is 10 bits wide.

Figure 8:
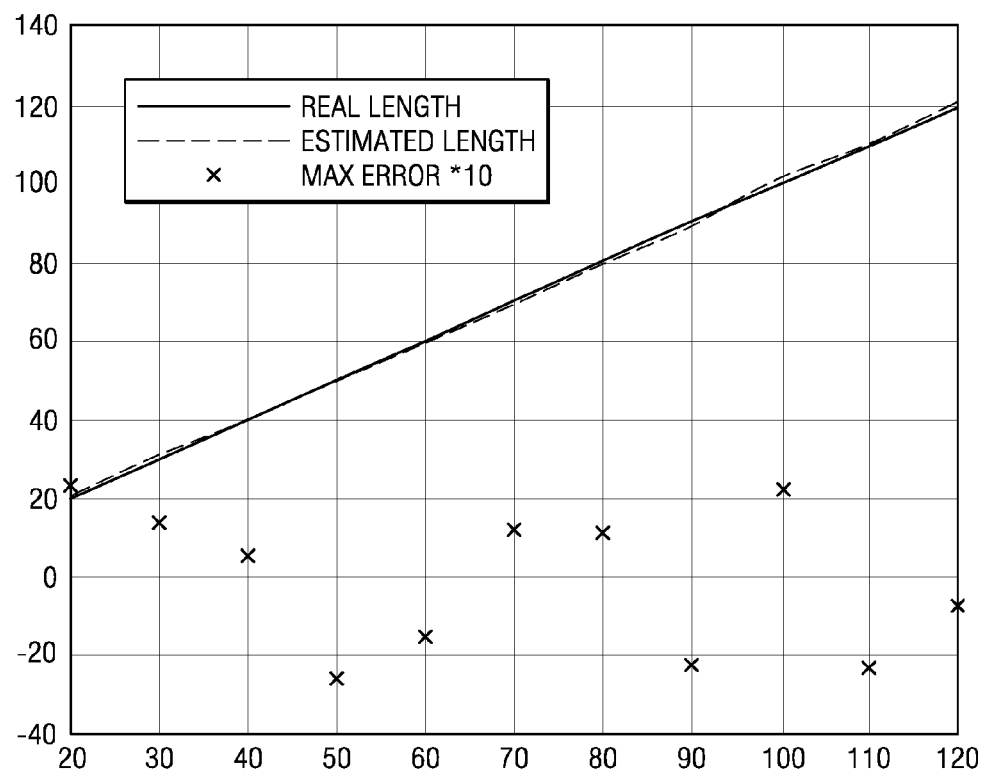
FIG. 8 is a diagram illustrating the comparison of example results for real and estimated lengths.

Once the values of SLP are obtained, they are then used to calculate the cable length estimate. In the example presented herein, the linear calibration coefficients can be determined using simulations, e.g., Matlab 'lsqcurvefit' command) such that the SLP point reflects the cable length, as shown in FIG. 8 where the 'X's indicate the maximum error times ten, the real length is indicated by the continuous line and the estimated cable length or linearly shifted SLP indicated by dashed line. Note that these calculations were done with single segment IEEE channels (Simwiz simulation). Note also that each length was run ten times and the largest error measured was 2.6 meters corresponding to 50 meter cable length.

It is important to note that a separate calibration of the linear constants is required for each cable topology tested. The basic calibration presented herein is for single element IEEE horizontal cables. If the cable topology comprises long patch cables (i.e. more than 5 meters on each side) or several different segments, different calibration constants need to be calculated as described supra the section entitled "DFT Length Estimation."

Simulation Results

Figure 9:
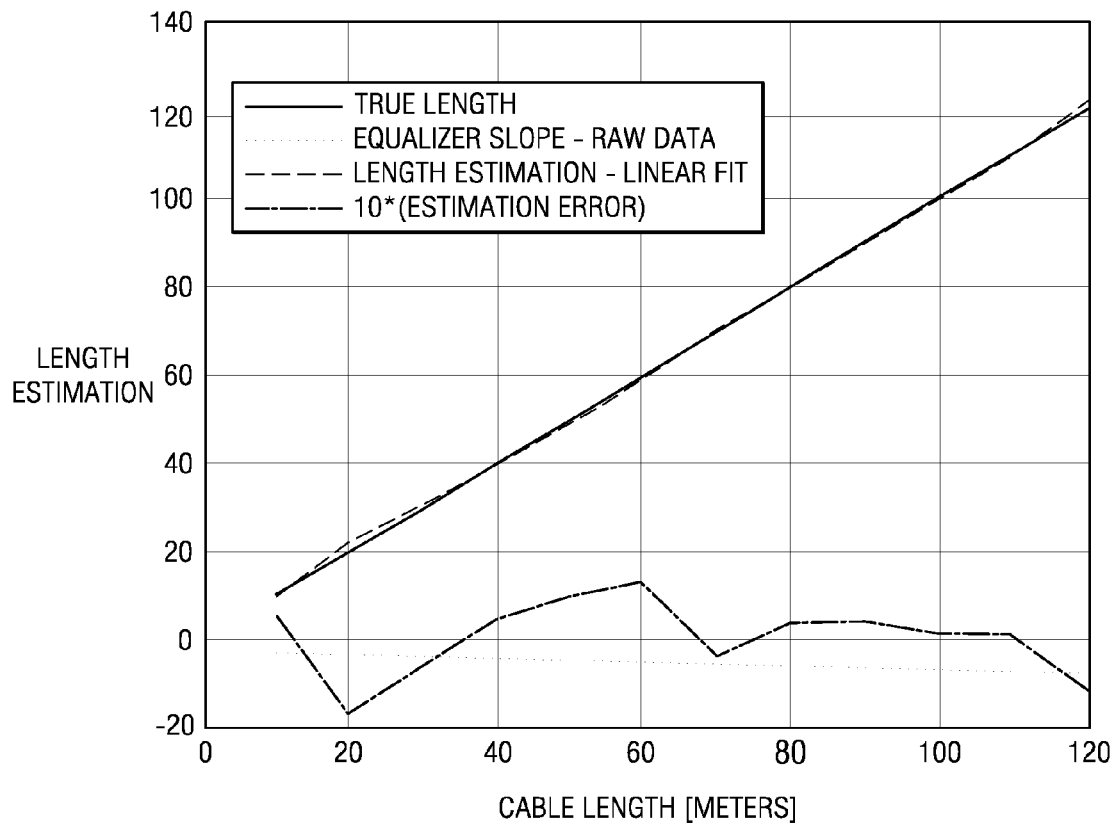
FIG. 9 is a diagram illustrating simulation results of a DFT length estimation for a single segment.

A diagram illustrating simulation results of a DFT length estimation for a single segment is shown in FIG. 9. The traces in FIG. 9 illustrate a single segment, horizontal (H) in various lengths. The continuous line represents the real length and the dashed line represents the estimated length. The dashed trace represents the estimation error times ten. It can be seen that the resultant maximal error is below 2 meters at a length of 20 meters. Since the load is matched, there is no reflection. The DFT engine is not quantized in this case.

The output of the cable diagnostics module comprises the calculated slope, from which the host extracts the cable length using the procedure described supra. Note that the linear calibration coefficients used to convert the calculated slope to the cable length estimate are predetermined, and thus must fit the cable topology anticipated. These calibration constants are configured manually, as the mean of different cable topologies. Note that generating the calibration constants using only a single cable topology is likely to yield a large error in the case of different cable topologies.

Figure 10:
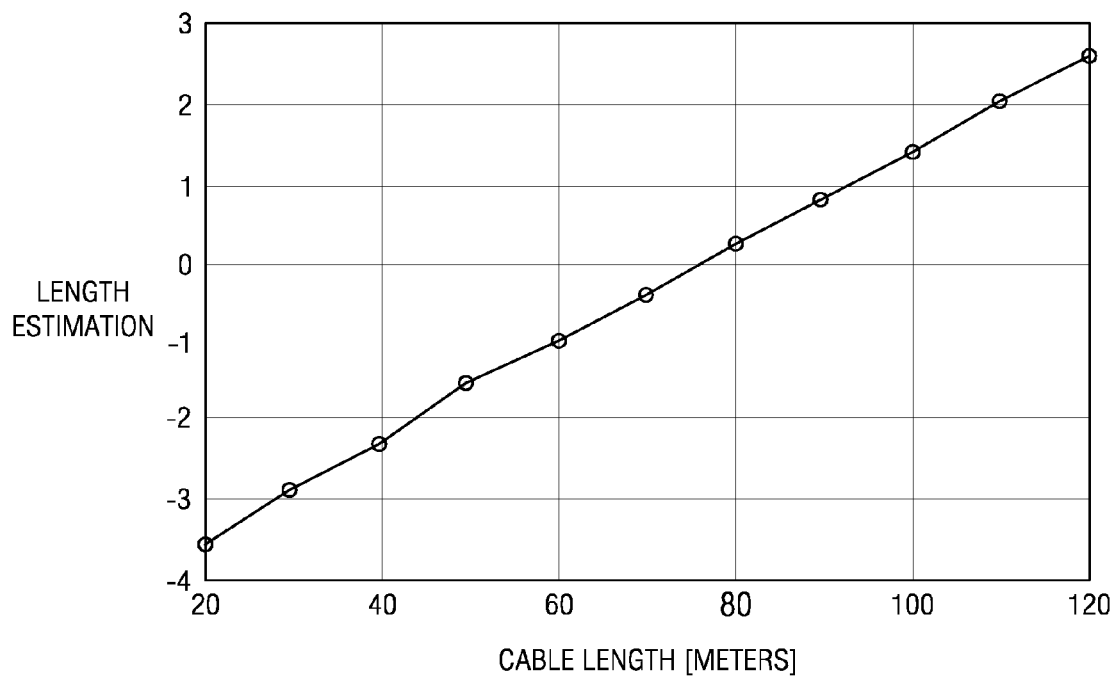
FIG. 10 is a diagram illustrating the slope of the simulated signal spectrum.
Figure 11:
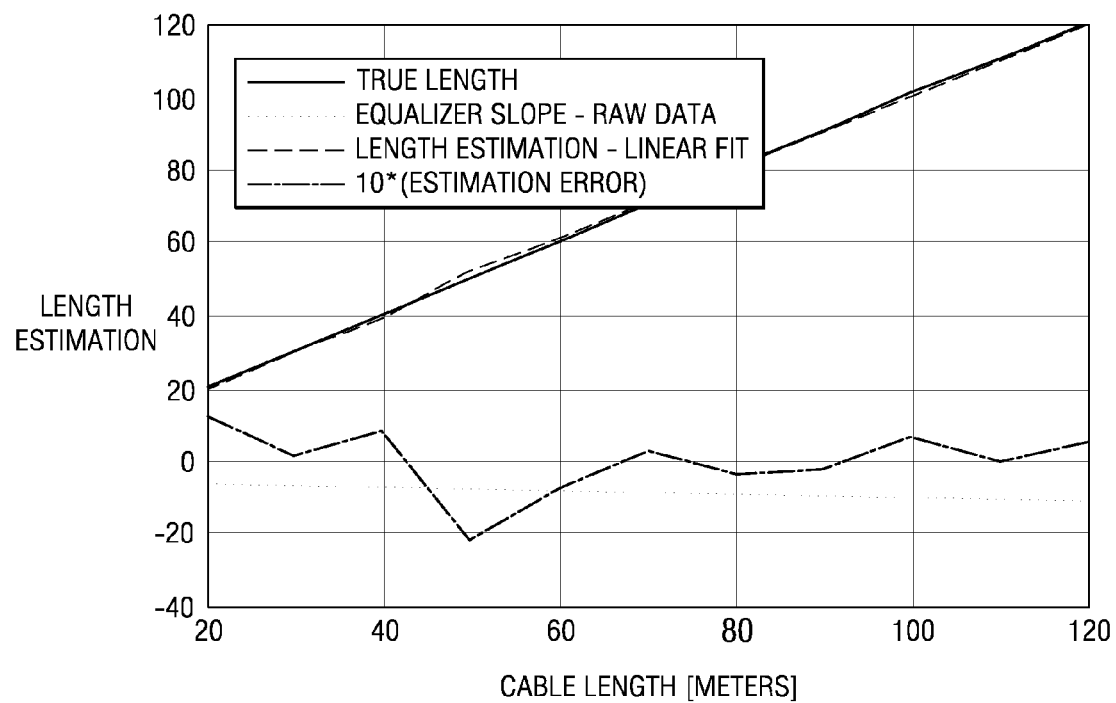
FIG. 11 is a diagram illustrating the error of the simulation of FIG. 10.

A diagram illustrating the slope of the simulated signal spectrum (e.g., Matlab simulation) is shown in FIG. 10. A diagram illustrating the error of the simulation of FIG. 10 is shown in FIG. 11. In FIG. 11, the continuous line represents the true actual cable length, the dashed line represents the estimated cable length from the linear fit, the dotted line represents the equalizer slope (i.e. raw data) and the dashed line represents tens times the estimation error.

Figure 12:
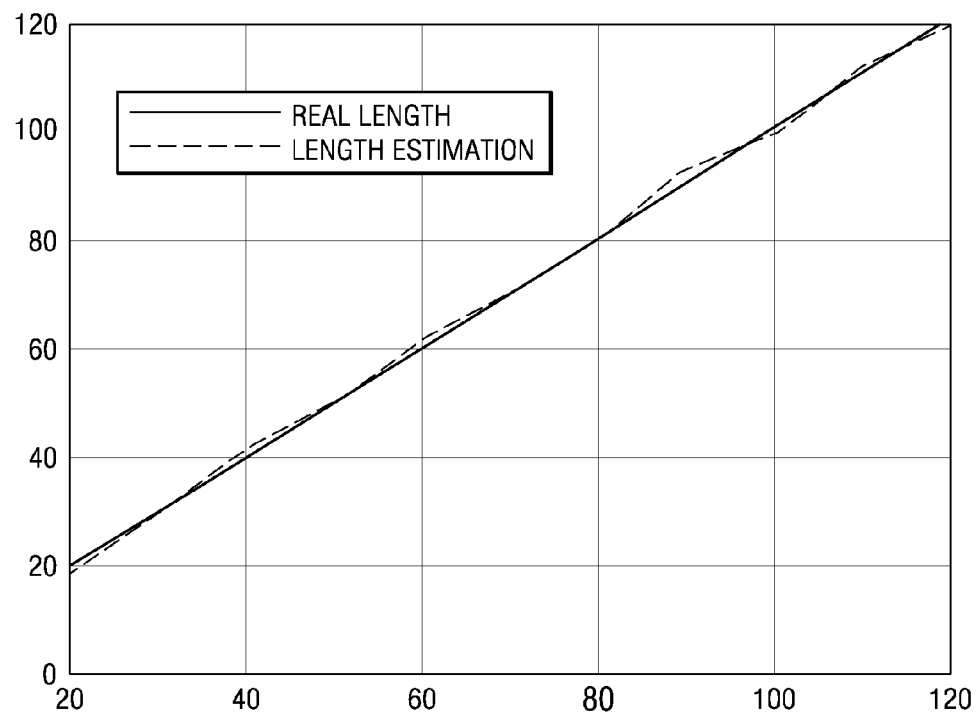
FIG. 12 is a diagram illustrating the best linear fit to the signal spectrum slope.

A diagram illustrating the best linear fit to the signal spectrum slope is shown in FIG. 12. The results of a Simwiz simulation show the best linear fit to the signal spectrum slope where the real length is represented as the continuous line and the estimated cable length is indicated by the dashed line. The 1024 bin FFT operation is averaged over 4096 iterations and the channels comprise IEEE channels. The frequencies measured are f1=24/1024 and f2=174/1024.

Figure 13:
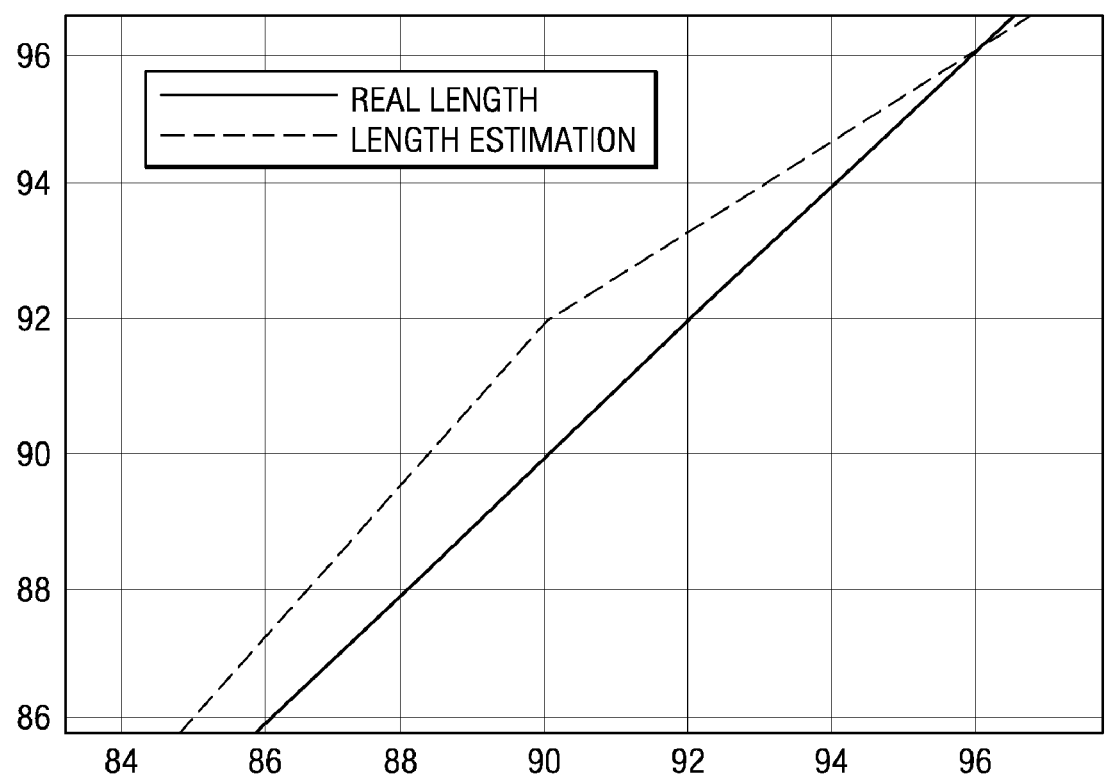
FIG. 13 is a diagram illustrating the comparison of results for real and estimated lengths.

A diagram focusing on the largest difference between the real and estimated lengths is shown in FIG. 13. The real length is represented as the continuous line and the estimated cable length is indicated by the dashed line. As indicated, the maximal error from the linear approximation is approximately 2 meters at 90 meter length.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of estimating the cable length of an active link in a network, said method comprising:
   determining a first channel spectrum magnitude at a first frequency and a second channel spectrum magnitude at a second frequency, said determining comprising:
      estimating said first channel spectrum magnitude and said second channel spectrum magnitude by performing a plurality of discrete Fourier transform (DFT) operations on a signal received over said link;
      taking an average of the results of said DFT operations to determine the spectrum magnitude at said first frequency and said second frequency calculating a channel spectrum slope from said first channel spectrum magnitude and said second channel spectrum magnitude; and calculating said cable length estimate from said channel spectrum slope.

2. The method according to claim 1, wherein said performing discrete Fourier transform (DFT) operations is done on a plurality of equalizer coefficients.

3. The method according to claim 2, wherein said plurality of equalizer coefficients comprise feed forward equalizer (FFE) and decision feedback equalizer (DFE) coefficients.

4. The method according to claim 1, wherein said first frequency is approximately 1.46 MHz and said second frequency is approximately 10.6 MHz.

5. The method according to claim 1, wherein said first frequency is approximately 7 MHz and said second frequency is approximately 43 MHz.

6. The method according to claim 1, wherein said network comprises an Ethernet based network.

7. A method of estimating the cable length of an active link in a network, said method comprising:

determining a first channel spectrum magnitude at a first frequency and a second channel spectrum magnitude at a second frequency;

calculating a channel spectrum slope from said first channel spectrum magnitude and said second channel spectrum magnitude; and calculating said cable length estimate from said channel spectrum slope, wherein said calculating said cable length estimate comprises calibrating a plurality of linear constants for each particular cable topology.

8. An apparatus for estimating the cable length of an active link in a network, comprising:

discrete Fourier transform (DFT) processor for measuring a first attenuation over said link at a first frequency and a second attenuation over said link at a second frequency by performing a plurality of discrete Fourier transform (DFT) operations on a signal received over said link, said DFT processor operable to take an average of the results of said DFT operations to determine the spectrum magnitude at said first frequency and said second frequency for use in calculating said slope;

means for calculating slope as a function of said first attenuation and said second attenuation measurements; and means for calculating said cable length estimate as a function of said slope and linear calibration constants $K_1$ and $K_2$.

9. The apparatus according to claim 8, wherein said performing discrete Fourier transform (DFT) operations is done on a plurality of equalizer coefficients.

10. The apparatus according to claim 9, wherein said plurality of equalizer coefficients comprise feed forward equalizer (FFE) and decision feedback equalizer (DFE) coefficients.

11. The apparatus according to claim 8, wherein said first frequency is approximately 1.46 MHz and said second frequency is approximately 10.6 MHz.

12. The apparatus according to claim 8, wherein said first frequency is approximately 7 MHz and said second frequency is approximately 43 MHz.

13. The apparatus according to claim 8, wherein said linear calibration constants $K_1$ and $K_2$ are calculated in accordance with a particular cable topology.

14. The apparatus according to claim 8, wherein said network comprises an Ethernet based network.

15. A cable modem, comprising:

a memory;

one or more interface ports;

a tuner coupled to a CATV cable having a plurality of channels, said tuner operative to tune a received broadband signal in accordance with a tune command;

a PHY circuit coupled to said tuner and operative to generate a baseband signal from the output of said tuner;

a cable diagnostics module for estimating the slope of the linear relationship between cable attenuation and length for an active link in a network, said cable diagnostics module comprising:

means for measuring a first attenuation over said link at a first frequency and a second attenuation over said link at a second frequency;

means for calculating slope as a function of said first attenuation and said second attenuation measurements; and a processor coupled to said memory, said one or more interface ports, said tuner, said cable diagnostics module and said PHY circuit, said processor operable to calculate said cable length estimate as a function of said slope and linear calibration constants $K_1$ and $K_2$.

16. The cable modem according to claim 15, wherein said linear calibration constants $K_1$ and $K_2$ are calculated in accordance with a particular cable topology.

17. The cable modem according to claim 15, wherein said network comprises an Ethernet based network.

18. The cable modem according to claim 15, wherein said means for measuring comprises means for performing discrete Fourier transform (DFT) operations on a plurality of equalizer coefficients.

19. The cable modem according to claim 18, wherein said plurality of equalizer coefficients comprise feed forward equalizer (FFE) and decision feedback equalizer (DFE) coefficients.

20. The cable modem according to claim 15, wherein said means for measuring comprises means for performing a plurality of discrete Fourier transform (DFT) operations on a signal received over said link.

21. The cable modem according to claim 20, wherein said means for performing DFT operations comprises means for taking an average of the results of said DFT operations to determine the spectrum magnitude at said first frequency and said second frequency for use in calculating said slope.

* * * * *